United States Patent Office 3,616,790

Patented Nov. 2, 1971

3,616,790

MULTIFORM VENTRICULAR PREMATURE BEAT DETECTOR

George J. Harris, Framingham, Mass., assignor to American Optical Corporation, Southbridge, Mass.

Filed Jan. 21, 1970, Ser. No. 4,670
Int. Cl. A61b 5/04
U.S. Cl. 128—2.06 A 10 Claims

ABSTRACT OF THE DISCLOSURE

A multiform ventricular premature beat (VPB) detector. Each VPB is classified in one of eight morphological categories. As long as all VPB's are classified in the same category a multiform alarm circuit is not energized. As soon as a VPB of a different morphology is detected, the alarm circuit is triggered to indicate a multiform VPB condition.

This invention relates to electrocardiographic monitoring systems, and more particularly to multiform ventricular premature beat (VPB) detectors.

A VPB is a ventricular contraction which occurs sooner after the preceding beat than it should have, and which is followed by another beat after a greater than normal inter-beat time period has elapsed. In other words, the interval between the first beat and the VPB plus the interval between the VPB and the next beat must be equal to approximately twice the normal inter-beat interval. The increased time period between the VPB and the next beat is designated a compensatory pause.

There are various criteria which are used in the medical profession for identifying a VPB. In my co-pending application Ser. No. 820,554 filed on Apr. 30, 1969, one condition which must be satisfied in order for a premature beat to be identified as a VPB is that it be followed by a compensatory pause. Furthermore, before a premature beat is identified as a VPB, one of two other conditions must be satisfied—the QRS waveform must have an unusually large area in comparison to normal QRS waveforms, or the shape of the QRS waveform must be different from those normally exhibited by the same patient. In my co-pending application, a system is disclosed which is capable of "learning" the normal QRS waveform shapes of any patient. Following a learning period, each monitored QRS waveform is compared to the previously learned normal waveforms (there may be more than one "normal" waveform) and any QRS waveform shape which is different from those previously learned is noted. The system also includes various timing circuits for detecting premature beats and compensatory pauses, as well as circuits for measuring the area of each QRS waveform. By combining the information determined by these various circuits, it is possible to detect a VPB in accordance with the criteria set forth above.

A VPB results from an electrical stimulus originating in the ventricle itself, as opposed to the normal transmission of the stimulus from the atrium. In many patients, there is only a single irritable focus in the ventricle which causes the VPB's. However, it is possible for there to be a number of irritable foci in the ventricle in which case a VPB can originate from a number of different places in the ventricle. It is of considerable interest to the cardiologist to know whether there is more than one irritable focus in the ventricle.

Because of the different spatial positions of the irritable foci in the ventricle, the stimulus from each focus results in a VPB having a unique morphology (QRS waveshape). By analyzing the waveshape of the QRS complex associated with each VPB, it is possible, in accordance with the principles of the present invention, to determine whether the VPB's have originated from more than one irritable focus. As used hereon, the term "multiform VPB's" refers to VPB's which originate in distinct and separate regions of the ventricle. (VPB's which originate from multiple regions in the ventricle are also known as "multifocal VPB's.")

It is a general object of my invention to detect multiform VPB's.

In the illustrative embodiment of my invention, each QRS waveform (VPB or other) is analyzed and classified in one of eight categories. Eight "temporary" flip-flops are provided, each representing a respective waveform category, and following the analysis of each QRS waveform a respective one of the temporary flip-flops is set in the 1 state. Shortly after the setting of one of the temporary flip-flops, a determination is made whether the particular beat was a VPB. Eight "permanent" flip-flops are also provided, each associated with a respective one of the temporary flip-flops. Initially, all of the permanent flip-flops are reset in the 0 state. As soon as a particular heartbeat is determined to have been a VPB, the 1 state of the respective temporary flip-flop is transferred to the associated permanent flip-flop. Although all temporary flip-flops are reset at the beginning of each beat-analyzing cycle, once a permanent flip-flop is set in the 1 state it remains in this state. Consequently, if any of the eight permanent flip-flops is in the 1 state, it is an indication that a VPB having the respective morphology was detected.

Associated with each pair of temporary and permanent flip-flops is a respective gate. Each permanent flip-flop, once in the 1 state, serves to disable operation of the respective gate. The gate operates only when the associated permanent flip-flop is in the 0 state and the associated temporary flip-flop is in the 1 state. If any gate is operated when the system determines that the previous beat was a VPB, it is an indication that a VPB of a new morphology has been detected.

The first VPB which is detected causes the associated permanent flip-flop to be set in the 1 state. A VPB of the respective morphology is thus recorded as having been detected. The associated gate is thereafter inhibited from operating because additional VPB's of the same morphology are "expected" to occur. As soon as the VPB of a different morphology is detected, the associated gate operates because initially the respective permanent flip-flop is still reset; the gate operation is an indication that there is a second irritable focus in the ventricle. At the same time, the permanent flip-flop is set in the 1 state so that the gate will not operate when subsequent VPB's of the same morphology (which are now also "expected" to occur) are detected. When a VPB of a third morphology is detected, the associated gate operates and the associated permanent flip-flop is set in the 1 state. As far as the system is concerned, the first time that a VPB of any morphology occurs, it is "learned"; VPB's of the same morphology are expected to occur in the future.

It is apparent that each type of VPB causes a respective gate to operate only once. In this manner, an output signal is available the first time that a VPB having a new morphology is detected. In the illustrative embodiment of my invention, a temporary flip flop and a permanent flip-flop are both assigned to ach VPB morphology. This is due to the fact that, when a system such as that disclosed in my co-pending application is utilized, a heartbeat is not determined to be a VPB until after the next heartbeat is detected. Since a heartbeat is not determined to be a VPB until it is determined that it is immediately followed by a compensatory pause, it cannot be determined that a "new" VPB has occurred until after the

MULTIFORM VENTRICULAR PREMATURE BEAT DETECTOR

Filed Jan. 21, 1970

INVENTOR.
GEORGE J. HARRIS
BY Amster & Rothstein
ATTORNEYS

United States Patent Office 3,616,790
Patented Nov. 2, 1971

1

3,616,790
MULTIFORM VENTRICULAR PREMATURE BEAT DETECTOR

George J. Harris, Framingham, Mass., assignor to American Optical Corporation, Southbridge, Mass.
Filed Jan. 21, 1970, Ser. No. 4,670
Int. Cl. A61b *5/04*
U.S. Cl. 128—2.06 A 10 Claims

ABSTRACT OF THE DISCLOSURE

A multiform ventricular premature beat (VPB) detector. Each VPB is classified in one of eight morphological categories. As long as all VPB's are classified in the same category a multiform alarm circuit is not energized. As soon as a VPB of a different morphology is detected, the alarm circuit is triggered to indicate a multiform VPB condition.

This invention relates to electrocardiographic monitoring systems, and more particularly to multiform ventricular premature beat (VPB) detectors.

A VPB is a ventricular contraction which occurs sooner after the preceding beat than it should have, and which is followed by another beat after a greater than normal inter-beat time period has elapsed. In other words, the interval between the first beat and the VPB plus the interval between the VPB and the next beat must be equal to approximately twice the normal inter-beat interval. The increased time period between the VPB and the next beat is designated a compensatory pause.

There are various criteria which are used in the medical profession for identifying a VPB. In my co-pending application Ser. No. 820,554 filed on Apr. 30, 1969, one condition which must be satisfied in order for a premature beat to be identified as a VPB is that it be followed by a compensatory pause. Furthermore, before a premature beat is identified as a VPB, one of two other conditions must be satisfied—the QRS waveform must have an unusually large area in comparison to normal QRS waveforms, or the shape of the QRS waveform must be different from those normally exhibited by the same patient. In my co-pending application, a system is disclosed which is capable of "learning" the normal QRS waveform shapes of any patient. Following a learning period, each monitored QRS waveform is compared to the previously learned normal waveforms (there may be more than one "normal" waveform) and any QRS waveform shape which is different from those previously learned is noted. The system also includes various timing circuits for detecting premature beats and compensatory pauses, as well as circuits for measuring the area of each QRS waveform. By combining the information determined by these various circuits, it is possible to detect a VPB in accordance with the criteria set forth above.

A VPB results from an electrical stimulus originating in the ventricle itself, as opposed to the normal transmission of the stimulus from the atrium. In many patients, there is only a single irritable focus in the ventricle which causes the VPB's. However, it is possible for there to be a number of irritable foci in the ventricle in which case a VPB can originate from a number of different places in the ventricle. It is of considerable interest to the cardiologist to know whether there is more than one irritable focus in the ventricle.

Because of the different spatial positions of the irritable foci in the ventricle, the stimulus from each focus results in a VPB having a unique morphology (QRS waveshape). By analyzing the waveshape of the QRS complex associated with each VPB, it is possible, in accordance with

2 the principles of the present invention, to determine whether the VPB's have originated from more than one irritable focus. As used hereon, the term "multiform VPB's" refers to VPB's which originate in distinct and separate regions of the ventricle. (VPB's which originate from multiple regions in the ventricle are also known as "multifocal VPB's.")

It is a general object of my invention to detect multiform VPB's.

In the illustrative embodiment of my invention, each QRS waveform (VPB or other) is analyzed and classified in one of eight categories. Eight "temporary" flip-flops are provided, each representing a respective waveform category, and following the analysis of each QRS waveform a respective one of the temporary flip-flops is set in the 1 state. Shortly after the setting of one of the temporary flip-flops, a determination is made whether the particular beat was a VPB. Eight "permanent" flip-flops are also provided, each associated with a respective one of the temporary flip-flops. Initially, all of the permanent flip-flops are reset in the 0 state. As soon as a particular heartbeat is determined to have been a VPB, the 1 state of the respective temporary flip-flop is transferred to the associated permanent flip-flop. Although all temporary flip-flops are reset at the beginning of each beat-analyzing cycle, once a permanent flip-flop is set in the 1 state it remains in this state. Consequently, if any of the eight permanent flip-flops is in the 1 state, it is an indication that a VPB having the respective morphology was detected.

Associated with each pair of temporary and permanent flip-flops is a respective gate. Each permanent flip-flop, once in the 1 state, serves to disable operation of the respective gate. The gate operates only when the associated permanent flip-flop is in the 0 state and the associated temporary flip-flop is in the 1 state. If any gate is operated when the system determines that the previous beat was a VPB, it is an indication that a VPB of a new morphology has been detected.

The first VPB which is detected causes the associated permanent flip-flop to be set in the 1 state. A VPB of the respective morphology is thus recorded as having been detected. The associated gate is thereafter inhibited from operating because additional VPB's of the same morphology are "expected" to occur. As soon as the VPB of a different morphology is detected, the associated gate operates because initially the respective permanent flip-flop is still reset; the gate operation is an indication that there is a second irritable focus in the ventricle. At the same time, the permanent flip-flop is set in the 1 state so that the gate will not operate when subsequent VPB's of the same morphology (which are now also "expected" to occur) are detected. When a VPB of a third morphology is detected, the associated gate operates and the associated permanent flip-flop is set in the 1 state. As far as the system is concerned, the first time that a VPB of any morphology occurs, it is "learned"; VPB's of the same morphology are expected to occur in the future.

It is apparent that each type of VPB causes a respective gate to operate only once. In this manner, an output signal is available the first time that a VPB having a new morphology is detected. In the illustrative embodiment of my invention, a temporary flip flop and a permanent flip-flop are both assigned to ach VPB morphology. This is due to the fact that, when a system such as that disclosed in my co-pending application is utilized, a heartbeat is not determined to be a VPB until after the next heartbeat is detected. Since a heartbeat is not determined to be a VPB until it is determined that it is immediately followed by a compensatory pause, it cannot be determined that a "new" VPB has occurred until after the next heartbeat is detected. The temporary flip-flop serves to register the morphology of each QRS waveform even before it is known that it is a VPB. When the next heartbeat is detected, if it has been determined that the previous heartbeat was a "new" VPB, the state of the temporary flip-flop is shifted to the permanent flip-flop so that a permanent record is made that a VPB of the particular morphology has been detected and an output pulse is generated.

Various schemes can be utilized to detect the multiform VPB condition based upon how many of the permanent flip-flops are in the 1 state. For example, a lamp can be associated with each permanent flip-flop, each lamp being energized when the associated flip-flop is in the 1 state. In such a case, the number of energized lamps is an indication of the number of VPB morphologies which have been detected.

It is a feature of my invention to classify the morphology of each VPB and to detect a multiform VPB condition when VPB's of multiple classifications have been detected.

Further objects, features and advantages of my invention will become apparent upon consideration of the following detailed description in conjunction with the drawing, in which:

FIG. 1 is a block diagram schematic of the electrocardiographic morphology recognition system disclosed in my co-pending application;

FIG. 3 is a timing diagram which will be helpful in understanding the invention.

Figure 2:
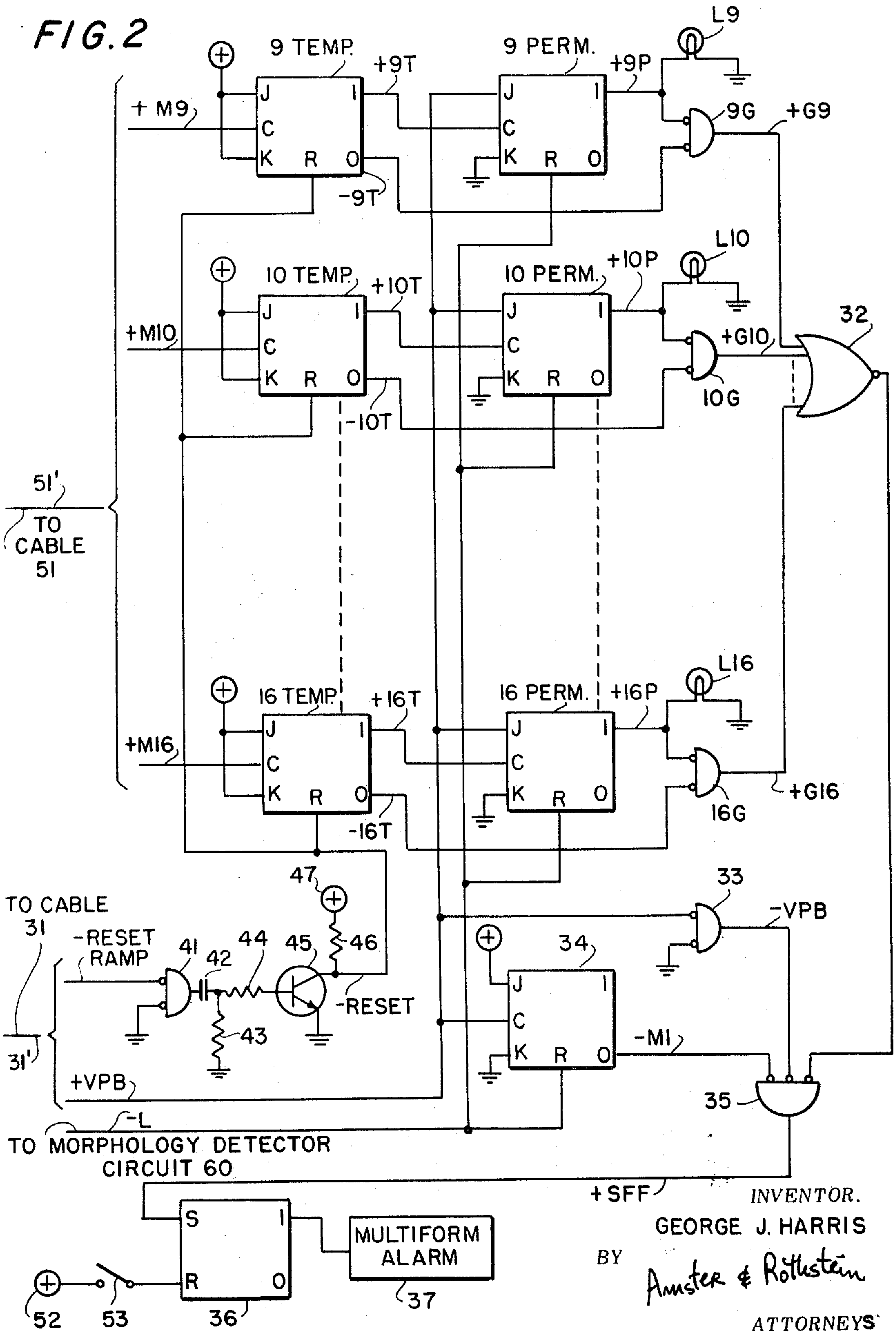
FIG. 2 depicts the illustrative embodiment of the present invention.

Referring to FIG. 1, various electrode leads from patient 35 are coupled to the input section of input and output circuit 20. The ECG signal of the patient is processed in the input and output circuit. The signal is transmitted over cable 22 to timing control circuit 30, interval detector circuit 70 and area detector circuit 40. The input and output circuit also derives separate signals indicative of various characteristics of each QRS waveform. Signals representing these characteristics are transmitted to recognition logic circuit 50 over cable 21.

Timing control circuit 30 serves to develop the timing signals which control the operations of all of the other circuits in the system. The timing control circuit detects the R wave in each QRS waveform, and generates a number of timing signals following the detection of each R wave. The timing signals are extended over cable 31 to all of the other circuits.

Interval detector circuit 70 serves to analyze the ECG signal with respect to its timing characteristics. The circuit includes a number of timers for detecting certain conditions in the ECG signal. For example, premature beats can be detected and are transmitted over cable 23 (which merges with cable 26 into cable 27) to input and output circuit 20, allowing any premature beat to be registered. The interval detector circuit also determines the presence of a compensatory pause and transmits an appropriate signal over conductor 24 to morphology detector circuit 60 and to input and output circuit 20.

Area detector circuit 40 serves primarily to detect an excessive area of a QRS waveform, one of the conditions which may result in the registration of a VPB condition. An excessive area results in an appropriate signal being transmitted over conductor 25 to morphology detector circuit 60.

Recognition logic circuit 50 responds to the sequence in which the various signals on the conductors in cable 21 are detected. Depending on the sequence, each QRS waveform is classified in one of eight categories, with which the numerals 9 through 16 are respectively associated in my co-pending application. Cable 51 includes eight conductors, corresponding to the eight possible QRS waveform categories, and at an appropriate time following the analysis of each waveform one of the eight conductors is energized.

The morphology detector circuit includes a timer 63 which is energized for a short period when switch 62 is operated. This switch is operated when the patient is first connected to the monitoring equipment and conductor —L drops from a positive potential to ground for a "learning" interval. During this learning interval, a record is made of the conductors in cable 51 which are energized, and thus a record is established of the "normal" QRS morphologies of the patient being monitored. Thereafter, if the morphology of a QRS waveform is different from those registered during the learning interval, a record is made so that the physician can be alerted.

The morphology detector circuit also includes circuitry for detecting a VPB. As described above, for a beat to be identified as a VPB, a premature beat must be followed by a compensatory pause, and the QRS waveform must either have an excessive area or must be different from the "normal" morphologies learned during the learning period.

FIG. 3 shows various timing waveforms, but only four of these are generated by timing control circuit 30 in the system disclosed in my co-pending application. These signals are the —STROBE, —RESET RAMP, +M9 and +VPB pulse waveforms. The —STROBE signal is generated at a point in each cycle following the analysis of each QRS waveform. The pulse has a duration of 60.6 milliseconds. The —RESET RAMP pulse, with a duration of 30 milliseconds, is generated during the last part of each —STROBE pulse. The +M9 pulse is generated together with the —STROBE pulse if the QRS waveform detected has morphology category number 9. (Similar remarks apply to pulses +M10 through +M16; any of these pulses is always generated together with the —STROBE pulse.) The +VPB pulse, unlike the —STROBE and —RESET RAMP pulses, is not generated during each cycle. The pulse is generated only if a VPB has occured. It should be noted that the +VPB pulse in FIG. 3, which occurs during the second —STROBE pulse, is an indication that the beat occurring before the first —STROBE pulse in the drawing was a VPB. This is due to the fact that the beat which occurs prior to the generation of the first —STROBE pulse is not determined to be a VPB until the next —STROBE pulse is generated by which time the compensatory pause has occurred. The other waveforms shown in FIG. 3 are generated in the system of FIG. 2 and will be described below.

In FIG. 2, cable 31' is extended to cable 31 of FIG. 1. The —RESET RAMP pulse of FIG. 3 is applied to one input of NAND gate 41. The +VPB pulse is applied to the J inputs of flip-flops 9PERM through 16PERM, the clock input of flip-flop 34, and one input of NAND gate 33. The —L pulse generated in morphology detector circuit 60 of FIG. 1 is extended over the —L conductor to the reset inputs of the same nine flip-flops.

Cable 51' is extended to cable 51. The cable includes eight conductors +M9 through +M16, one of which is energized when the —STROBE pulse is generated. In FIG. 3, the +M9 pulse is shown generated during —STROBE time.

Before the system is put into operation, switch 53 is closed momentarily to extend the positive potential of source 52 to the reset input of flip-flop 36. The flip-flop is reset with the 1 output going low in potential.

With the generation of the —L pulse in the morphology detector circuit, the system of FIG. 1 "learns" normal QRS waveforms of the patient being monitored. Thereafter, any waveforms which is different from those previously learned causes an appropriate signal to be generated. The —L pulse is used in the multiform VPB detector circuit of FIG. 2 for resetting the eight "permanent" flip-flops 9PERM through 16PERM and flip-flop 34.

The —RESET conductor is connected to the reset input of each of the eight "temporary" flip-flops 9TEMP through 16TEMP. Referring to FIG. 3, the —RESET pulse is .6 milli-seconds in width and occurs at the leading edge of the −RESET RAMP pulse. The −RESET pulse is derived from the −RESET RAMP pulse by the circuit including NAND gate 41 and transistor 45. One input of the NAND gate is grounded. The −RESET RAMP conductor is normally high in potential so that the output of the gate is normally low. When the −RESET RAMP pulse is generated, both inputs to the gate are low and the output goes high. Current flows through capacitor 42 and resistor 43 to ground. As the current flows, the potential drop across resistor 43, coupled through resistor 44 to the base of transistor 45, is sufficient to turn the transistor on. The collector of the transistor is normally at the potential of source 47. When the transistor turns on, current flows from source 47 through resistor 46 and the transistor to ground. The collector terminal drops in potential and the −RESET conductor goes low. As capacitor 42 continues to charge, the voltage drop across resistor 43 decreases. Eventually the drop is insufficient to maintain conduction of transistor 45. At this time the transistor turns off and the −RESET conductor goes high in potential once again. Capacitor 42 and resistor 43 have magnitudes such that the transistor conducts for only .6 millisecond.

Following the detection of each QRS waveform, during the generation of the −STROBE pulse, one of conductors +M9 through +M16 goes high. Each of these conductors is connected to the clock input of a respective one of the flip-flops 9TEMP through 16TEMP. The J and K inputs of each flip-flop are held at a positive potential. As is known in the art, if the J and K inputs of a J/K flip-flop are held at a positive potential, the flip-flop is set in the 1 state when a negative step is applied to the clock input. Thus, for example, when the +M9 conductor goes low in potential, flip-flop 9TEMP is set in the 1 state and, as shown in FIG. 3, conductor +9T goes high in potential. At the end of every −STROBE pulse, following the detection and analysis of a QRS waveform, one of the temporary flip-flops is set in the 1 state. The flip-flop remains in this state until the −RESET pulse is generated during the next −STROBE pulse. Thus, as shown in FIG. 3, when a QRS waveform of type 9 is detected, conductor +9T goes high in potential at the trailing edge of the −STROBE pulse (that is, at the trailing edge of pulse +M9) and it remains high until the −RESET pulse is generated during the next cycle.

The function of the permanent flip-flops 9PERM through 16PERM is to register the morphology types of the VPB's which have occurred. Although every QRS waveform causes one of the eight temporary flip-flops to be set in the 1 state, the corresponding permanent flip-flops should not be set at this time because the generation of a pulse on one of conductors +M9 through +M16 merely identifies the morphology of the QRS waveform which has been detected; when this conductor goes high it is not yet known whether the waveform represents a VPB. If the beat detected was a VPB, the fact is not determined until after the next beat is detected, at which time conductor +VPB goes high. It is only at this time that the state of the temporary flip-flop should be transferred to the associated permanent flip-flop in order to permanently register the fact that a VPB of a particular morphology occurred.

The K input of each of flip-flops 9PERM through 16PERM is grounded. When the single previously set temporary flip-flop is switched from the 1 state to the 0 state with the generation of the −RESET pulse, the associated one of conductors +9T through +16T goes low in potential. Each of these conductors is coupled to the clock input of a respective one of the eight permanent flip-flops and thus with the generation of the −RESET pulse a negative step is applied to the clock input of one of the eight permanent flip-flops. The +VPB conductor is connected to the J input of each of the eight permanent flip-flops. The conductor is normally low in potential and thus both the J and K inputs of each flip-flop are normally low in potential. In such a case, negative steps at the clock input of any flip-flop do not cause the flip-flop to switch from the 0 state to the 1 state. However, if a VPB has been detected, conductor +VPB goes high as indicated in FIG. 3. The +VPB pulse occurs prior to the generation of the −RESET pulse. Thus, for example, assuming that flip-flop 9TEMP is in the 1 state following the generation of pulse +M9, it is seen that conductor +VPB, connected to the J input of flip-flop 9PERM, goes high before flip-flop 9TEMP resets. It is true that the +VPB pulse terminates before flip-flop 9TEMP is reset and conductor +9T goes low to apply a negative step to the clock input of flip-flop 9PERM, as shown in FIG. 3. However, a J/K flip-flop can be switched to the 1 state as long as the J input goes high while the K input is grounded, provided the clock input is high. Even if the J input thereafter goes low, the flip-flop will be switched to the 1 state when the clock input goes low.

Thus the +VPB pulse is capable of priming any one of flip-flops 9PERM through 16PERM to be switched to the 1 state when its clock input goes low. But the only clock input which goes low is that connected to the 1 output of the previously set temporary flip-flop since it is only this flip-flop which is reset with the generation of the −RESET pulse.

It is thus apparent that each temporary flip-flop serves to store the morphology type number of the previous QRS waveform until the next QRS waveform is processed and a+VPB pulse is generated if the first waveform represented a VPB. Following the generation of the +VPB pulse and the transfer of the 1 state from a temporary flip-flop to a permanent flip-flop, the −RESET pulse is generated to reset the previously set temporary flip-flop. Immediately thereafter, with the termination of the −STROBE pulse, another one of the temporary flip-flops is set in the 1 state in accordance with the morphology of the second waveform. (It is possible, of course, that the same temporary flip-flop will be switched back to the 1 state if the second QRS waveform has the same morphology as the first.)

Conductor +9P, connected to the 1 output of flip-flop 9PERM, is extended to one input of NAND gate 9G. When flip-flop 9PERM is set in the 1 state, the conductor goes high and the gate is permanently disabled. Output conductor +G9 remains low in potential. Similar remarks apply to the other seven permanent flip-flops and gates 10G through 16G.

Initially, flip-flop 9PERM is reset by the −L pulse and one input of gate 9G is enabled. The other input, connected to conductor −9T, is high in potential since flip-flop 9TEMP is initially reset in the 0 state. However, when the flip-flop is switched to the 1 state when conductor +M9 goes low, conductor −9T goes low in potential and gate 9G operates. Conductor +G9 goes high and remains high for as long as flip-flop 9TEMP is in the 1 state. This is shown in FIG. 3—conductor +G9 is high for as long as conductor +9T is high (that is, for as long as flip-flop 9TEMP is in the 1 state).

However, conductor +G9 goes high following the generation of every +M9 pulse only until a +VPB pulse is generated. If the +VPB pulse is not generated, it is an indication that the QRS waveform whose morphology type (number 9) is stored in flip-flop 9TEMP does not represent a VPB and flip-flop 9PERM is not switched to the 1 state. But if the waveform did represent a VPB, with the generation of the +VPB pulse flip-flop 9PERM is switched to the 1 state thereafter; conductor +G9 cannot go high in potential. Until a +VPB pulse is generated, conductor +G9 goes high in potential following every +M9 pulse. Once a +VPB pulse is generated conductor +G9 remains low. Similar remarks apply to the other pairs of temporary-permanent flip-flops and gates 10G through 16G.

Each of conductors +G9 through +G16 is extended to one input of NOR gate 32'. Since the eight input conductors to the gate are normally low in potential, the output is normally high. The output goes low only when one of conductors +G9 through +G16 goes high in potential. When the output of the NOR gate goes low it is an indication that the QRS waveform morphology represented in that one of the temporary flip-flops which is in the 1 state is different from the morphologies of all VPB's which occurred earlier.

Gate 35 functions to cause conductor +SFF to go high whenever a detected QRS waveform represents a VPB, provided a VPB of the same morphology did not occur earlier. One input of NAND gate 33 is grounded and the other is connected to conductor +VPB. Consequently, with the generation of each +VPB pulse, conductor —VPB goes low in potential. This conductor is connected to one of the inputs of NAND gate 35. Assume for the moment that conductor —M1, connected to a second of the inputs of NAND gate 35, is also low in potential. In such a case the output of the gate goes high when the output of NOR gate 32 goes low. The output of the NOR gate goes low when the QRS waveform represented in a temporary flip-flop has a morphology different from the morphologies of the VPB's detected earlier. This condition is not enough to operate gate 35 because conductor +SFF should go high only if the QRS waveform being operated upon also represents a VPB. Since conductor —VPB is connected to one input of gate 35, it is apparent that the gate operates to energize conductor +SFF only if the QRS waveform being operated upon represents a VPB and has a morphology different from the morphologies of the previous VPB's which are detected. When conductor +SFF goes high, flip-flop 36 is set in the 1 state. The 1 output of the flip-flop goes high to energize multiform alarm circuit 37.

In the illustrative embodiment of the invention, it is desired not to operate the multiform alarm circuit when the first VPB is detected. The alarm circuit should be operated only if the VPB's which are detected are characterized by two or more of the eight possible morphologies. Flip-flop 34 prevents the setting of flip-flop 36 in the 1 state and the operation of the multiform alarm circuit when the first VPB is detected. Flip-flop 34 is initially reset by the —L pulse. The J input of the flip-flop is at a high potential and the K input is grounded. As long as the flip-flop is reset, the 0 output connected to conductor —M1 is high in potential and gate 35 is disabled. When the first VPB is detected and conductor +VPB goes high, it has no effect on flip-flop 34 even though it is coupled to the clock input. It is only at the termination of the pulse that flip-flop 34 switches state and conductor —M1 goes low. One input of gate 35 is connected to conductor —VPB. The first time that this conductor goes low in potential, conductor —M1 is high in potential thus disabling gate 35, by the time conductor —M1 goes low in potential to enable the gate, conductor —VPB has gone high. Thus the first time that a VPB is detected, gate 35 cannot operate.

However, the first VPB does result in the setting of one of the eight permanent flip-flops. The associated one of gates 9G through 16G is therefore disabled and subsequent VPB's of the same morphology cannot result in the operation of NOR gate 32. It is only when a VPB of a second morphology is detected that gate 35 operates to set flip-flop 36 in the 1 state which in turn triggers the multiform alarm circuit.

In the illustrative embodiment of the invention the multiform alarm circuit is triggered as soon as a VPB of a second morphology is detected. It may be desired to determine whether a VPB of yet a third morphology is detected. In such case, switch 53 is operated to reset flip-flop 36. The multiform alarm circuit turns off. At this time, two of the permanent flip-flops are in the 1 state and further VPB's of the morphology represented by either flip-flop do not result in the operation of NOR gate 32. It is only if a VPB of a third morphology occurs that gate 35 operates again to set flip-flop 36 in the 1 state and the alarm circuit is triggered. To detect a VPB of a fourth morphology, all that is required is to reset flip-flop 36 once again. With three of the permanent flip-flops set in the 1 state, VPB's of three different morphologies (those which already occurred at least once each) do not result in the operation of NOR gate 32. It is only if a VPB having one or the other five morphologies is detected that alarm circuit is triggered once again.

Alternatively, it may be desired to provide lamps L9 through L16 connected to the 1 outputs of respective permanent flip-flops. When any permanent flip-flop is set in the 1 state, the associated lamp is energized to indicate that a VPB of the corresponding morphology has been detected. Simply by observing the lamp, it is possible to determine the total number of different VPB morphologies which have occurred up to the moment of observation.

Although the invention has been described with reference to a particular embodiment, it is to be understood that this embodiment is merely illustrative of the application of the principles of the invention. Numerous modifications may be made therein and other arrangements may be devised without dparting from the spirit and scope of the invention.

What is claimed is:

1. A multiform ventricular premature beat (VPB) detector comprising means for characterizing each QRS waveform of a patient as one of a predetermined number of morphology types, means for detecting if a QRS waveform resulted from a VPB, and means for registering each morphology type characterizing at least one QRS waveform which resulted from a VPB.

2. A multiform VPB detector in accordance with claim 1 wherein said registering means includes means for temporarily storing the morphology type of each QRS waveform, means for permanently storing a temporarily stored morphology type, and means for controlling the operation of said permanently storing means only if the QRS waveform whose morphology type is temporarily stored is detected to have resulted from a VPB.

3. A multiform VPB detector in accordance with claim 2 further including means operative in response to the temporary storage of any morphology type only before said any morphology type is first permanently stored for indicating the occurrence of QRS waveforms of said morphology type.

4. A multiform VPB detector in accordance with claim 1 further including means for detecting the registering of at least two morphology types.

5. A multiform VPB detector in accordance with claim 1 further including output means operative in response to the first time that the second and each succeeding morphology type is determined to characterize a QRS waveform which resulted from a VPB.

6. A multiform ventricular premature beat (VPB) detector comprising means for determining if a QRS waveform of a patient resulted from a VPB, means for characterizing the morphology type of each QRS waveform which is determined to have resulted from a VPB, and means for indicating if the QRS waveforms which are determined to have resulted from VPB's are characterized by at least a predetermined number of different morphology types.

7. A multiform VPB detector in accordance with claim 6 wherein said predetermined number is two.

8. A multiform VPB detector in accordance with claim 6 further including means for registering each morphology type which characterized at least one QRS waveform which resulted from a VPB.

9. A multiform VPB detector in accordance with claim 6 wherein said registering means includes means for temporarily storing the morphology type of each QRS waveform, means for permanently storing a temporarily stored morphology type, and means for controlling the operation of said permanently storing means only if the QRS waveform whose morphology type is temporarily stored is determined to have resulted from a VPB.

10. A multiform VPB detector in accordance with claim 9 further including means operative in response to the temporary storage of any morphology type only before said any morphology type is first permanently stored for indicating the occurrence of QRS waveforms of said morphology type.

References Cited

UNITED STATES PATENTS

| | | | |
|---|---|---|---|
| 3,144,019 | 8/1964 | Haber | 128—2.06 A |
| 3,352,300 | 11/1967 | Rose | 128—2.06 A |
| 3,524,442 | 8/1970 | Horth | 128—2.06 A |

WILLIAM E. KAMM, Primary Examiner